L. J. MONAHAN, DEC'D.
B. J. DALY, ADMINISTRATOR.
AIR HOSE STAND.
APPLICATION FILED OCT. 16, 1919.
1,360,559.
Patented Nov. 30, 1920.
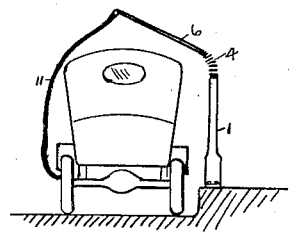
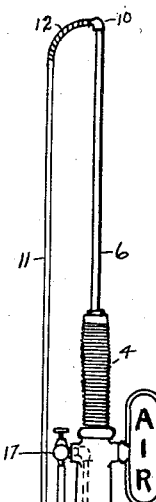
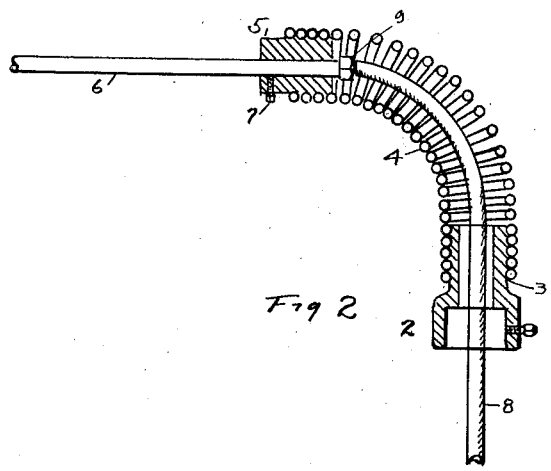
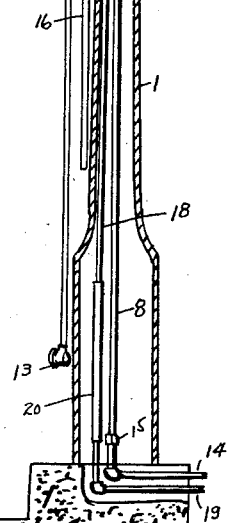

UNITED STATES PATENT OFFICE.

LOUIS J. MONAHAN, OF OSHKOSH, WISCONSIN; BER J. DALY ADMINISTRATOR OF THE ESTATE OF SAID LOUIS J. MONAHAN, DECEASED.

AIR-HOSE STAND.

1,360,559.  Specification of Letters Patent.  Patented Nov. 30, 1920.

Application filed October 16, 1919. Serial No. 331,061.

*To all whom it may concern:*

Be it known that I, LOUIS J. MONAHAN, a citizen of the United States, residing at Oshkosh, in the county of Winnebago and State of Wisconsin, have invented certain new and useful Improvements in Air-Hole Stands, of which the following is a specification.

The invention relates to a new and useful apparatus for supporting hose or tubing for various purposes.

The object being to eventually support the hose or tubing so that it will automatically return to a desired position when it is not in use.

In the drawings Figure 1 shows the complete apparatus; Fig. 2 is a detail of the flexible joint; Fig. 3 is a view illustrating the apparatus in use.

A cast iron column 1 is provided with a suitable supporting foot and said column is cored for its entire length. The top end of the column is machined to receive a sleeve 2 which is fitted thereon and held in place by means of a set screw.

The sleeve 2 has a coarse thread cut on its outer surface 3. A tightly wound helical spring 4 is fitted on to this threaded portion, the latter being of the same pitch as the spring in order to hold the spring thereon. A plug 5 having an axial aperture is threaded on to the outer end of the spring 4.

A pipe 6 extends through the bore of the plug 5 and is held in position by means of a set screw 7.

The pipe 6 has a rubber tube or hose 8 attached to its inner end by means of a union 9, which must be fitted outside and the pipe then passed through the plug 5 and locked in position.

At the top end of the pipe 6 an elbow 10 is fitted and a long piece of hose 11 attached thereto, the hose 11 being wrapped with a wire spring 12 a short distance from the elbow to prevent the hose from kinking or bending too short. At the other end of the hose an automatic air valve 13 is attached.

The hose 8 extends down through the column and connects with a service pipe by means of a union, which gives flexibility for the pipe 6 to be swung in any direction.

Another hose 16 for supplying water is provided and is attached to a valve 17, which connects through elbow and fittings to a pipe 18 inside the column and which further connects with a service water pipe through a hose connection.

Fig. 3 shows the apparatus in use in supplying air to motor car tires, the valve 13 can be carried around the car in all directions to reach all tires, the pipe 6 bending down to the light pull on the hose 11, the spring 4 bending in any direction of pull and giving any easy bend to the hose 8 inside thereof.

When not in use the spring 4 lifts the pipe 6 to a vertical position as shown in Fig. 1 where it remains until again used.

In case water is desired, same can be had from the hose 16 by opening the valve 17.

The apparatus is principally designed for use at garages, filling stations, and tire shops for the inflating of tire, but can be used for various other purposes, such as car washing, lamp carrying or any purpose requiring a flexible, returnable support.

I claim:—

1. A hose stand comprising a hollow vertical column, a flexible portion attached to the top thereof and having a tube extending from the flexible portion and having a hose connected therewith, another hose connected with the other end of the tube extending down through the flexible portion and the column for connection to a service pipe.

2. A hose stand comprising a hollow column having a yielding top portion holding a normal vertical position, a tube extending from the top portion and having a service hose attached to the outer end thereof, and another hose attached to the inner end and extending downward through the yielding top portion and column for connection with a service pipe.

3. An apparatus of the class described comprising a hollow supporting standard, a yielding connection secured to one end of said standard, a pipe secured to the yielding connection and normally held in a predetermined position thereby, means for supplying fluid to said pipe, a flexible hose connected to said pipe, and a valve provided at one end of the flexible hose.

4. An apparatus of the class described comprising a support, having a yielding top portion, a rigid portion extending from the yielding portion and having a hose attached thereto, means for supplying fluid to the said hose from a service supply near the bottom of the support.

5. A hose stand comprising a support, a helical spring having one end attached to the support, a tube attached to the other end of the spring and having a hose extending from the outer end thereof, another hose attached to the inner end of the tube and adapted to pass through the spring and support, the spring being capable of yielding to pull on the first said hose, but adapted to regain its normal position upon release.

In testimony whereof I affix my signature.

LOUIS J. MONAHAN.